US006483025B1

(12) United States Patent
Samsi et al.

(10) Patent No.: US 6,483,025 B1
(45) Date of Patent: Nov. 19, 2002

(54) MODULAR CENTER SPINE CABLE TRAY SYSTEM

(75) Inventors: A. Gene Samsi, Lafayette Hill, PA (US); Roger W. Deihm, Pottstown, PA (US)

(73) Assignee: T.J. Cope Inc., Collegeville, PA (US)

( * ) Notice: Subject to any disclaimer, the term of this patent is extended or adjusted under 35 U.S.C. 154(b) by 0 days.

(21) Appl. No.: 09/506,133

(22) Filed: Feb. 17, 2000

Related U.S. Application Data (60) Provisional application No. 60/120,555, filed on Feb. 17, 1999.

(51) Int. Cl.[7] .................................................. H02G 3/08
(52) U.S. Cl. ...................... 174/48; 174/68.1; 174/68.3; 248/68.1; 138/50
(58) Field of Search ..................... 174/48, 68.1, 68.3, 174/101, 157, 72 R, 97, 72 C, 95, 72 A; 138/156; 248/49, 68.1

(56) References Cited

U.S. PATENT DOCUMENTS

| 4,432,519 A | * | 2/1984 | Wright ................. 174/72 A X |
| 5,100,086 A | | 3/1992 | Rinderer |
| 5,123,618 A | * | 6/1992 | Guterman et al. ............ 248/49 |
| 5,372,341 A | | 12/1994 | Witherbee |
| 5,391,840 A | * | 2/1995 | Hughes et al. ............. 174/68.3 |
| D361,982 S | | 9/1995 | Rinderer |
| 5,465,929 A | | 11/1995 | Dooley |
| 5,564,658 A | | 10/1996 | Rinderer |
| 5,580,014 A | | 12/1996 | Rinderer |
| 5,587,555 A | | 12/1996 | Rinderer |
| 5,618,014 A | | 4/1997 | Rinderer |
| 5,628,481 A | | 5/1997 | Rinderer |
| 5,634,614 A | | 6/1997 | Rinderer |
| 5,639,048 A | | 6/1997 | Bartholomew |
| 5,651,518 A | | 7/1997 | Rinderer |
| D411,950 S | | 7/1999 | Dinh |
| 6,019,323 A | * | 2/2000 | Jette ............................ 248/49 |
| 6,198,047 B1 | * | 3/2001 | Barr ......................... 174/68.3 |

FOREIGN PATENT DOCUMENTS

| GB | 2 026 782 | * | 2/1980 | .................. 174/48 |
| GB | 2 254 966 | * | 10/1992 | .................. 174/48 |

* cited by examiner

*Primary Examiner*—Dean A. Reichard
*Assistant Examiner*—Dhiru R Patel
(74) *Attorney, Agent, or Firm*—Banner & Witcoff, Ltd.

(57) ABSTRACT

The present invention relates to a cable tray for supporting conduit thereon. The tray includes an elongated spine section which includes first and second section channels which extend along opposing first and second surfaces thereof. The tray has a plurality of support member assemblies which have a plate end and a support end opposite the plate end. The plate end of the support member assembly engages the first and second section channels, and includes at least one fastening aperture. The support end extends away from the elongated spine section. The tray also has a plurality of fasteners for threadably engaging the at least one fastening aperture of said support member plate end. The fasteners secure the support member assemblies at a desired location along the first and second section channels whereby support member assemblies are slidably positioned at a desired location and fastened thereto to provide a custom arrangement of support member assemblies about the spine section.

16 Claims, 11 Drawing Sheets

MODULAR CENTER SPINE CABLE TRAY SYSTEM

REFERENCE TO RELATED APPLICATION

This is an application under 35 U.S.C. Section 119(e) based upon a previously filed provisional application, Ser. No. 60/120555 filed Feb. 17, 1999, which is incorporated herein by reference, and which is co-pending.

BACKGROUND OF THE INVENTION

Cable tray systems are utilized in many applications wherein electrical conductors, typically large gauge electrical conductors, are required to operably link remotely located electrical components. The cable tray provides a rigid structure which is anchored along a predetermined pathway to facilitate the routing and support of electrical conductors therealong.

The known cable tray structures are typically formed of a series of "rungs" or support members transversely arranged between parallel side rails, with the side rails being supported along the predetermined pathway. Heavy sections of large gauge conductors and/or groups of smaller gauge conductors are supported by the cable tray and in this way are securely routed to remotely located electrical components along both indoor and outdoor paths. Typically, the conductor pathways are chosen so as to confine the conductors along areas such as ducts and/or conduit channels.

Several factors influence the desirability of cable tray systems. Such factors include the ease in which the cable tray can be installed and configured, the ability to customize the structure of the cable tray system framework to existing structure and to compensate for uneven weight distribution, and the ease in which the cable tray system can be anchored at desired locations.

In order to provide a cable tray system whereby such factors as ease of installation and customization are provided, it would be desirable to provide a modular cable tray system which includes modular center spine sections that can be interconnected to form a continuous pathway and having adjustable cable support members that can be located at any position along the center spine to provide an improved flexibility in cable tray system configuration.

SUMMARY OF THE INVENTION

The cable tray system of the present invention is primarily directed to applications wherein electrical conductors, typically large-gauge electrical conductors, are required to operably link remotely located electrical components. The cable tray system provides a rigid structure which is anchored along a predetermined pathway to facilitate the routing and support of electrical conductors thereon. The present invention relates to a cable tray for supporting conduit thereon. The tray comprises an elongated spine section which includes a first and a second section channel which extend along opposing first and second surfaces thereof. The tray has a plurality of support member assemblies which have a plate end and a support end opposite the plate end. The plate end of the support member assembly engages the first and second section channels, and includes at least one fastening aperture. The support end extends away from the elongated spine section. The tray also has a plurality of fasteners for threadably engaging the at least one fastening aperture of said support member plate end. The fasteners secure the support member assemblies at a desired location along the first and second section channels whereby support member assemblies are slidably positioned at a desired location and fastened thereto to provide a custom arrangement of support member assemblies about the spine section. The cable tray system is preferably constructed of an aluminum alloy.

BRIEF DESCRIPTION OF THE SEVERAL VIEWS OF THE DRAWINGS

The foregoing summary, as well as the following detailed description of the preferred embodiments of the invention, will be better understood when read in conjunction with the appended drawings and supplemental materials. For the purpose of illustrating the invention, there is shown in the drawings embodiments which are presently preferred. It should be understood, however, that the invention is not limited to the precise arrangements and instrumentalities shown.

In the drawings.

DETAILED DESCRIPTION OF THE INVENTION

Certain terminology is used in the following description for convenience only and is not limiting. The words "right," "left," "lower," and "upper" designate directions in the drawings to which reference is made. The words "inwardly" and "outwardly" refer to directions toward and away from, respectively, the geometric center of the modular cable tray system 10 in accordance with the present invention, and designated parts thereof. The terminology includes the words noted above as well as deviates thereof and words of similar import. The term "section" as used herein refers to a specific modular component of the modular cable tray system 10, the term "segment" refers to a plurality of interconnected modular components. The term "system" as used herein refers to a plurality of interconnected segments.

Figure 1:
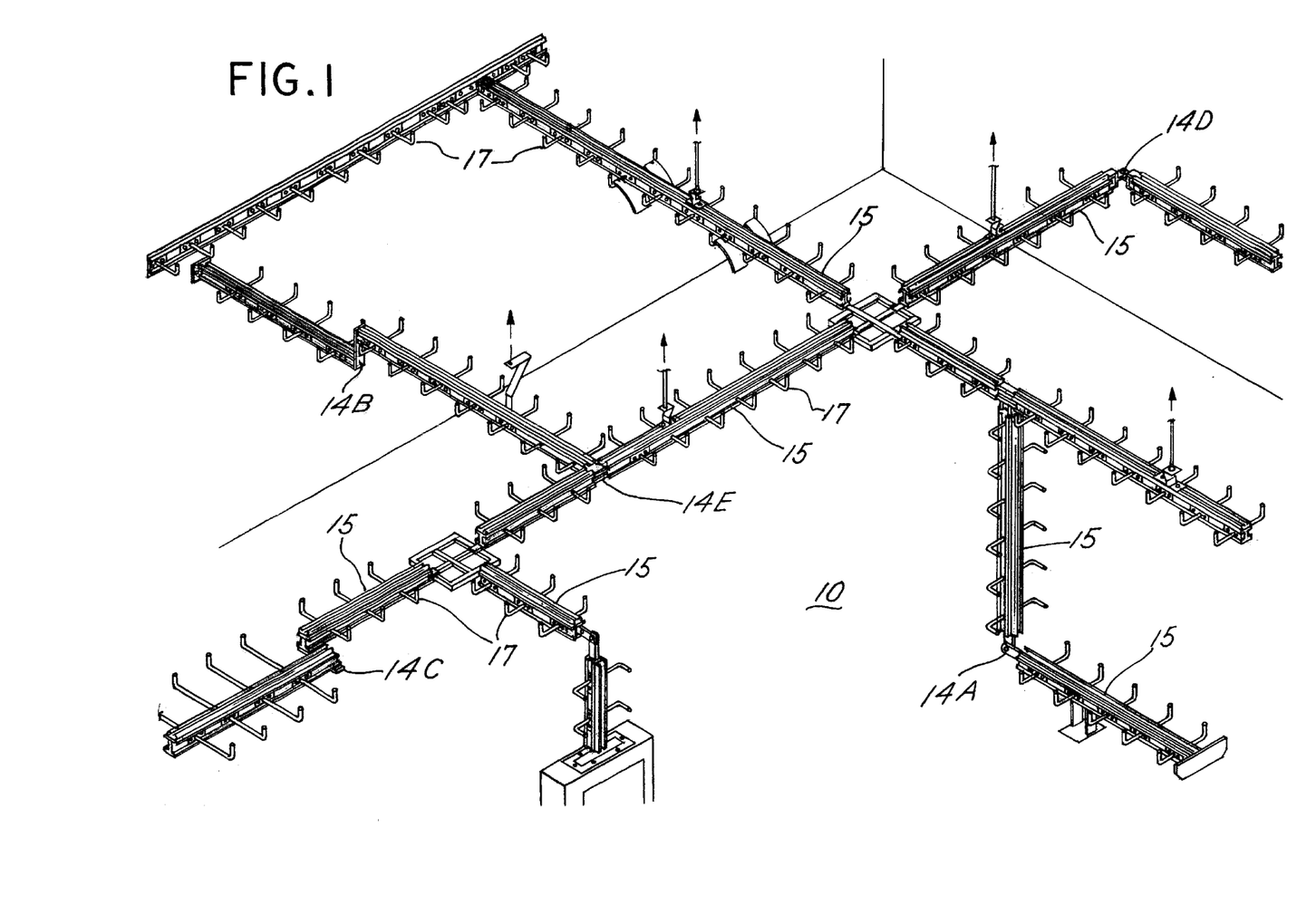
FIG. 1 is a perspective view of a modular cable tray system in accordance with the present invention.

Referring to the drawings, where like numerals indicate like elements throughout, there is shown in FIG. 1, a modular cable tray system 10 in accordance with the present invention.

Figures 1A, 1B, 1C:
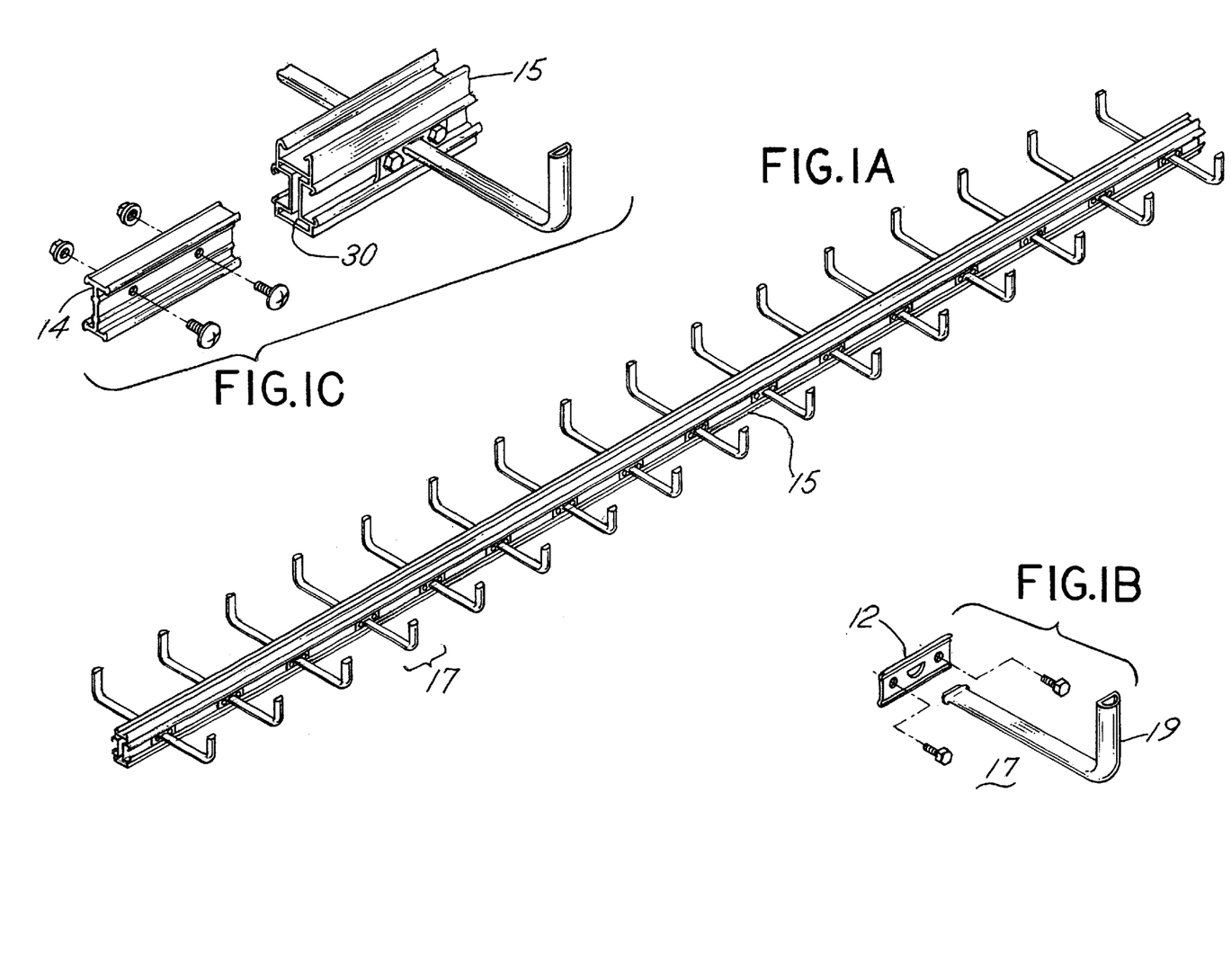
FIG. 1A is a perspective view of a first portion of the modular cable tray system and sectional components in accordance with the present invention.
FIG. 1B is an enlarged exploded perspective view of a support member assembly of the modular cable tray system shown in FIG. 1A.
FIG. 1C is an enlarged perspective view showing the engagement of a straight connector fitting with a spine section of the modular cable tray system shown in FIG. 1A.
Figure 6:
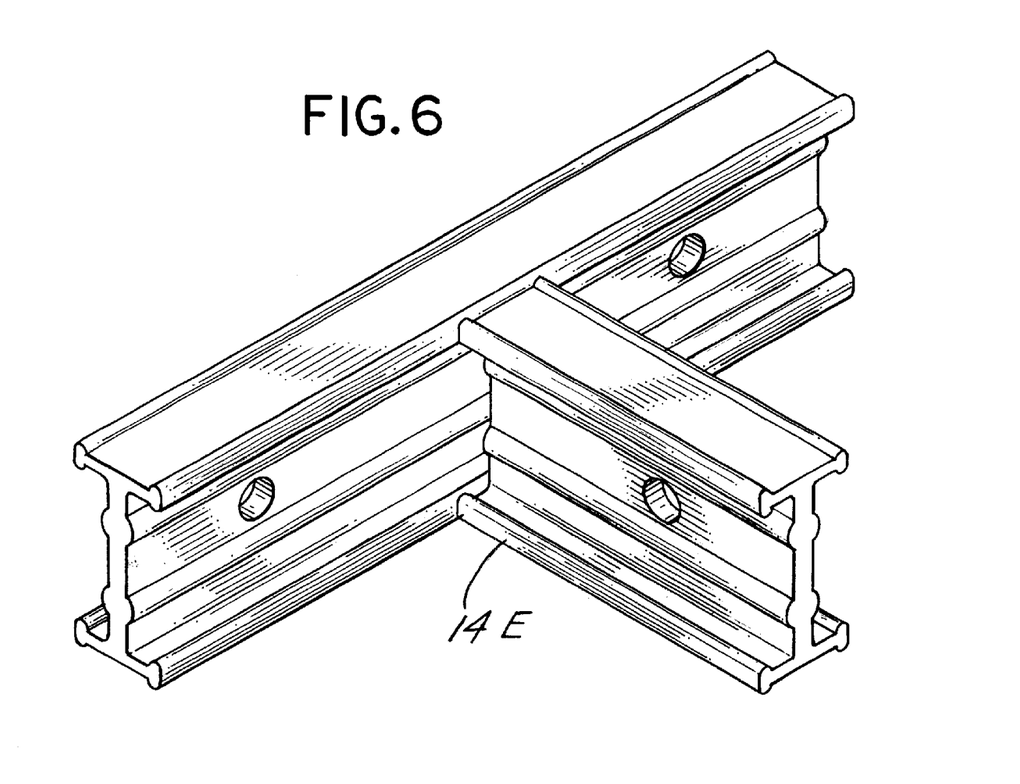
FIG. 6 is a perspective view of a horizontal flat tee splice used in the modular cable tray system of FIG. 1.
Figure 7:
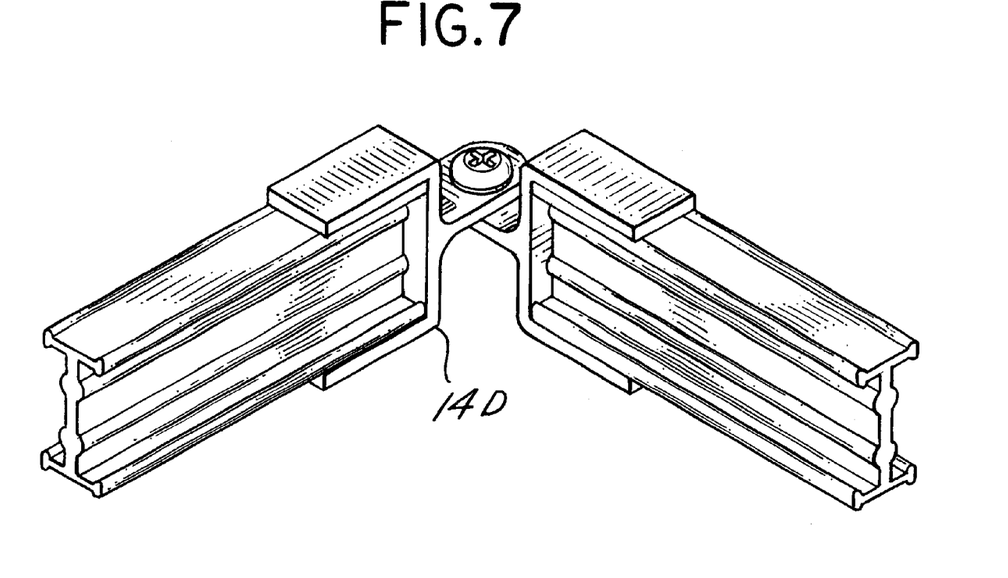
FIG. 7 is a perspective view of a horizontal adjustable angle splice used in the modular cable tray system of FIG. 1.
Figure 7A:
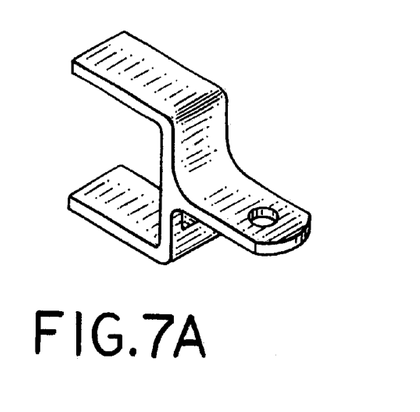
FIG. 7A is a perspective view of one portion of the adjustable splice hinge fitting shown in FIG. 7.
Figure 7B:
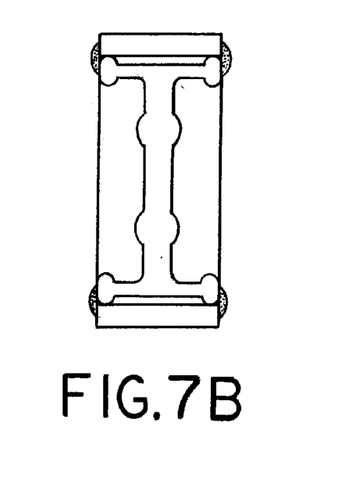
FIG. 7B is an end view showing the connection of the hinge fitting in FIG. 7 to the splice plug.
Figure 8:
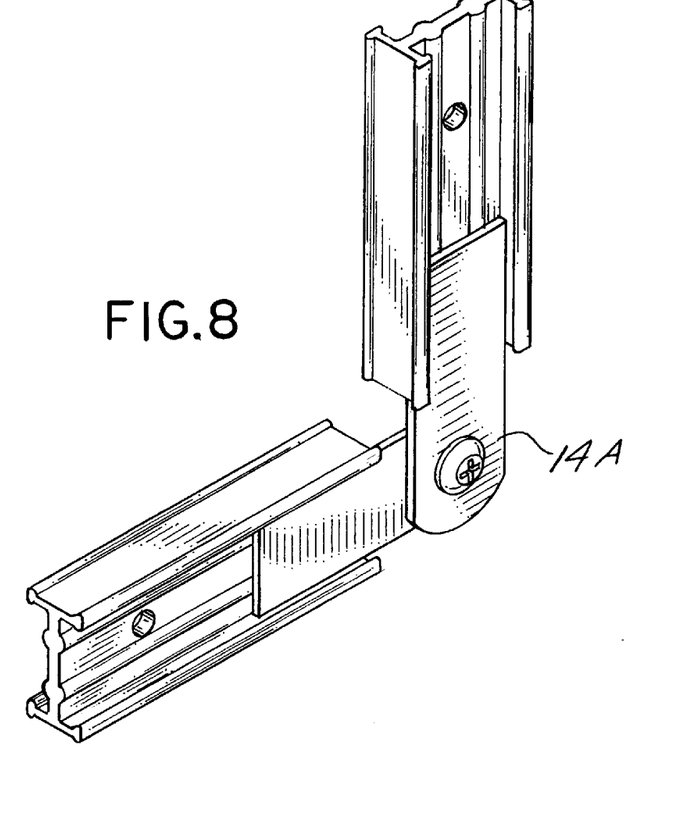
FIG. 8 is a perspective view of a vertical adjustable splice used in the modular cable tray system of FIG. 1.
Figure 8A:
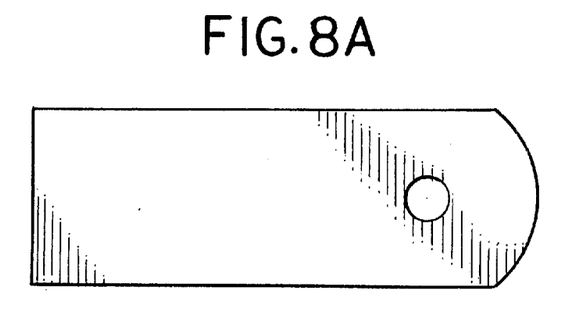
FIG. 8A is a plan view of one portion of the adjustable splice shown in FIG. 8.
Figure 8B:
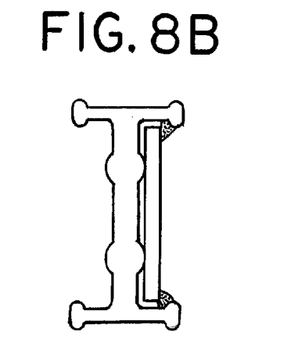
FIG. 8B is an end view showing the connection of the hinge fitting in FIG. 8 to the splice plug.
Figure 11:
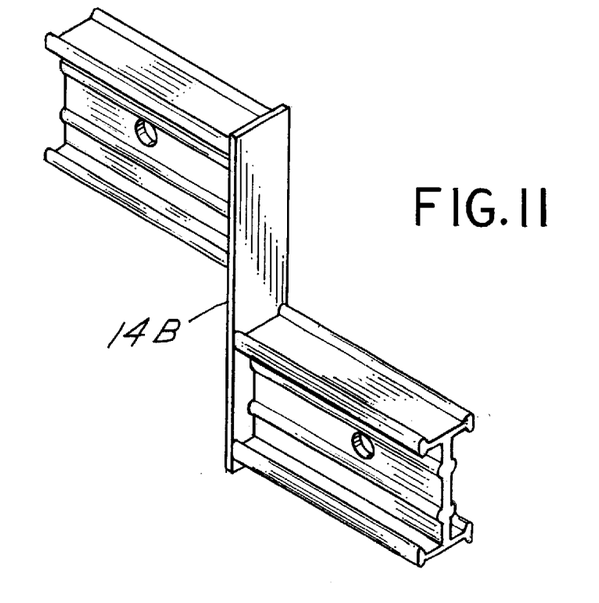
FIG. 11 is a perspective view of a vertical offset connector used in accordance with the present invention.
Figure 12:
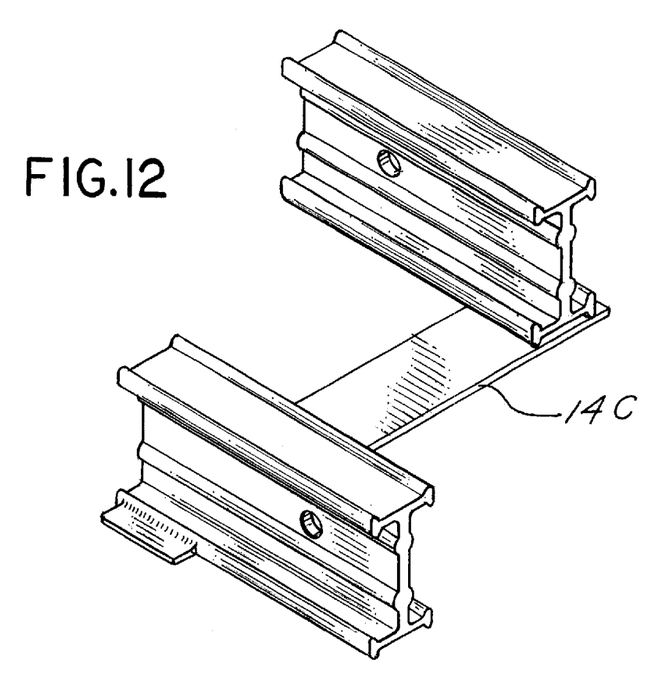
FIG. 12 is a perspective view of a horizontal offset connector used in accordance with the present invention.

The modular cable tray system 10 includes at least one spine section 15 having a plurality of support members or rung assemblies 17 adjustably connected thereto. Connector fittings (referred to generally as 14) may be used to interconnect a plurality of spine sections 15. The spine sections 15 are interconnected by way of fittings 14 so as to provide a continuous spine segment of a desired length or configuration. Spine sections 15 and segments may be interconnected by a number of different fittings 14, 14A–14F. For example, generally vertical or angled spine sections 15 and horizontal sections 15 are connected by vertical hinged fitting 14A (FIGS. 8, 8A, 8B), and parallel segments lying in separate planes are connected by vertical or horizontal offset fittings 14B, 14C (FIGS. 11 and 12). Other connectors are also shown such as a horizontal hinged fitting 14D (FIG. 7), a "T" joint fitting 14E (FIG. 6), and an expansion fitting 14F (FIG. 3A). As shown in FIG. 1B, the support member assemblies 17 comprise a conveyor nut 12 with an attached support member arm 19. Along with a plurality of support member assemblies 17, the continuous spine sections 15 provide a rigid structure for routing electrical wiring or conduit therealong.

Preferably the cable tray spine sections 15 are manufactured of a high strength aluminum alloy such as 6063-T6. Support member assemblies 17 and conveyor nuts, or support member plates, 12 are preferably also manufactured of aluminum alloy 6063-T6. However, it will be recognized by those skilled in the art from the present disclosure that the spine sections 15, the support member assemblies 17, the conveyor nuts 12, and/or the fittings 14 can be manufactured from other suitable metallic or polymeric materials having the desired physical properties for particular applications, such as molded fiberglass.

Referring to FIG. 1C, a spine section 15 is shown in engaging relation to a basic straight connector fitting 14. As shown in detail in FIG. 2, the spine section 15 includes an interior interconnection channel 30, a first side attachment slot 26A, a second side attachment slot 26B, and an anchoring slot, or channel, 24. An alternate embodiment of a spine section 15A is shown in FIG. 2A, and is similar to the spine 15 and includes an additional lower anchoring slot 24A.

Figures 2, 2A:
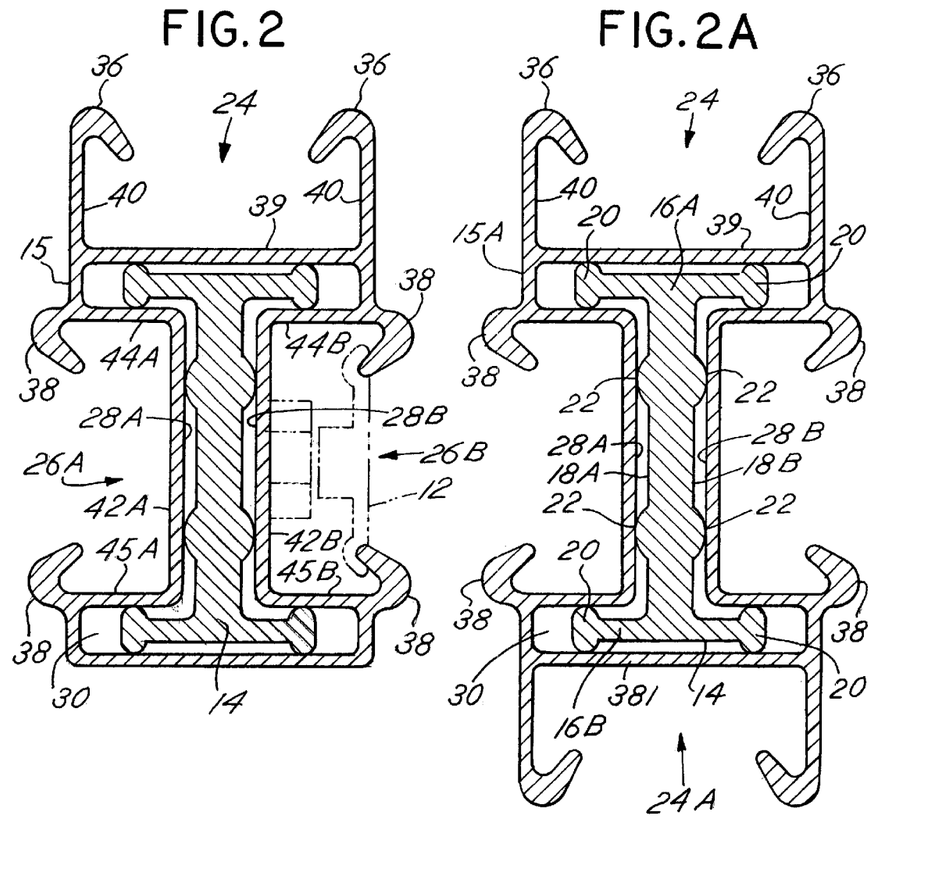
FIG. 2 is a cross sectional view of a first embodiment of a spine with an installed connector fitting of the modular cable tray system of FIG. 1A.
FIG. 2A is a cross sectional view of a second embodiment of a spine of the modular cable tray system similar to the first embodiment shown in FIG. 2.

As shown in detail in FIGS. 1C and 2, the interconnection channel 30 is provided to slidably receive the fitting 14 to interconnect multiple spine sections 15. The channel 30 is bounded by interior surfaces 28A and 28B.

The attachment slots, or section channels, 26A and 26B are provided to slidably receive the conveyor nuts 12 or other attachment members such that the conveyor nuts 12 are slidably adjusted to a desired location along the spine section 15 of a spine segment. The conveyor nuts 12 can be slidably adjusted along the entire length of the spine segment because the interconnected spine sections 15 form unitary slots 26A and 26B along the spine segment. As shown in FIG. 2 and 2A, the slots 26A and 26B are bounded individual spine section vertical facing surfaces 42A and 42B and horizontal facing surfaces which define channel walls 44A, 45A, 44B and 45B respectively, as well as flange sections, or arcuate end sections, 38. However, the specific arrangement and size of the slots 26A, 26B can be varied.

Figure 9:
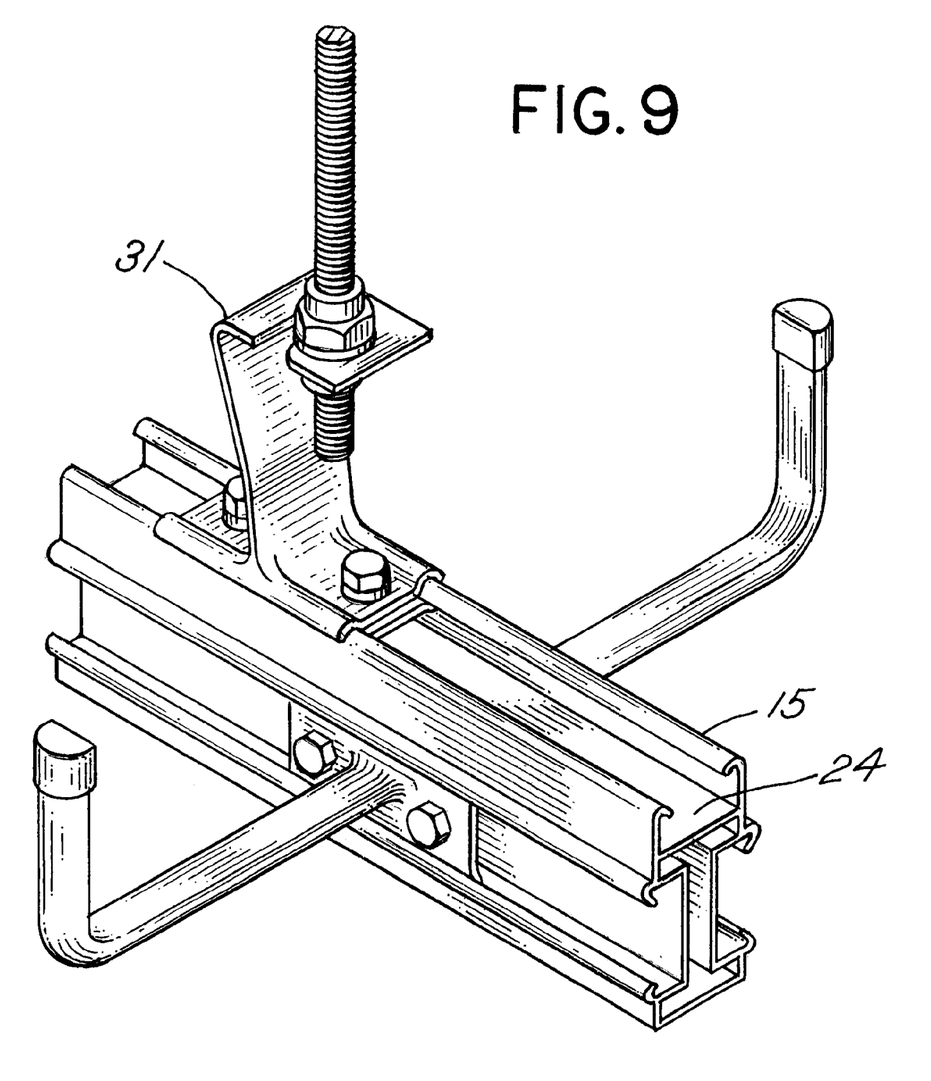
FIG. 9 is a perspective view showing a hanger support connected to a spine of the modular cable tray system in accordance with the present invention.

The spine section anchoring slot 24 is provided to receive support attachments, such as a support bracket 31 as shown in FIG. 9, for securing the spine sections 15 to outside structure at various points along a spine segment 15. The anchoring slot 24 is bounded by horizontal facing surface 39, vertical facing surfaces which define anchor walls 40, and lips 36. While a preferred configuration for the anchoring slot 24 is shown in the drawings, it will be recognized by those skilled in the art from the present disclosure that the shape and size could be varied to suit particular applications.

Still with reference to FIGS. 2 and 2A, a cross sectional view of the basic straight connector fitting 14 is also shown secured in the interconnection channel 30 of a spine section 15. The fitting 14 includes an upper T-section 16A, a lower T-section 16B and opposing channel facing surfaces 18A and 18B, the channel facing surfaces include bulbous spacer portions 22 which are sized to provide a sliding fit with the interior surface 28A, 28B of the channel 30. The T-sections 16A and 16B also preferably include bulbous spacer portions 20 to provide a sliding fit in the respective T-section receiving areas in the channel 30.

As shown in FIGS. 2 and 2A, the straight connector fitting 14 is inserted into the channels 30 of two adjacent spine sections 15 for securing multiple spine sections 15 together to form a continuous spine path. A first end of the fitting 14 is inserted into a first spine section 15 and the other end of fitting 14 extends outward from the first spine section interconnect channel 30 for engagement to a second spine section 15. Preferably, nuts and bolts as shown in FIG. 1C are used to secure the fitting 14 in position. However, it will be recognized by those skilled in the art from the present disclosure that other types of connectors on mechanical fasteners can be used.

The first spine section end of the splice fitting 14 slidably engages the interconnect channel 30 for securing the connection between consecutive spine sections 15. The interconnect channel interior surfaces 28A and 28B are in facing engagement with the bulbous portions 22 of the fitting member surfaces 18A and 18B in order to provide a load carrying connection which will maintain the structural integrity of the interconnected spines 15.

Figure 3:
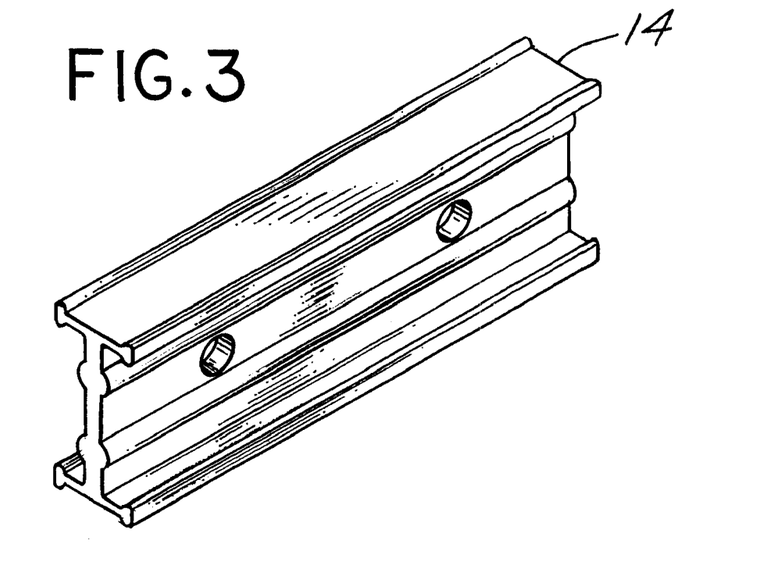
FIG. 3 is a perspective view of the fitting shown in FIG. 2.
Figure 3A:
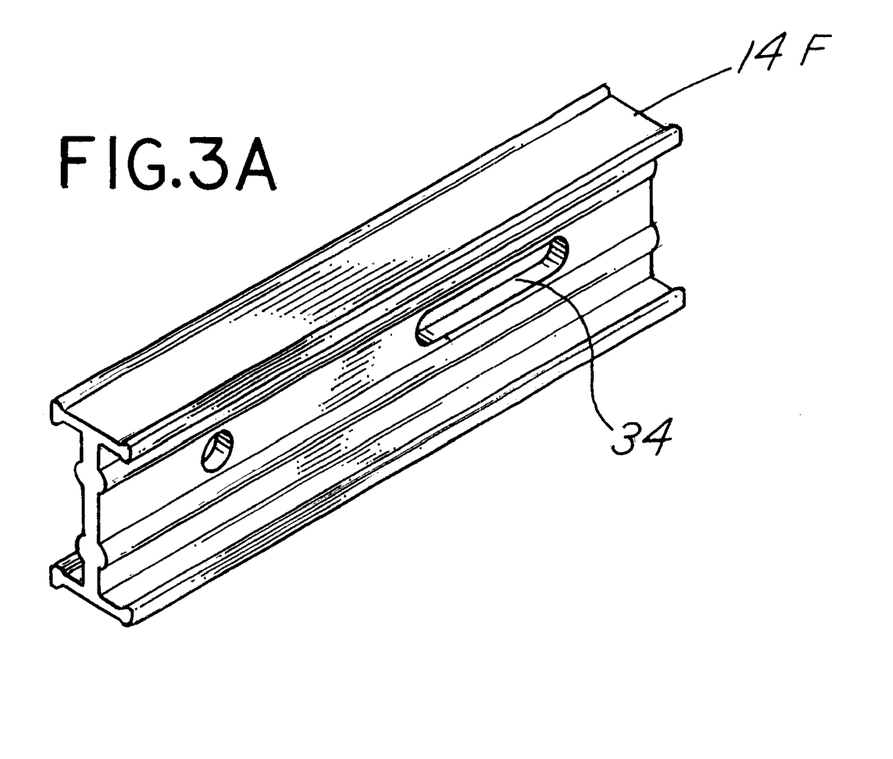
FIG. 3A is a perspective view of an expansion connector fitting similar to the connector fitting shown in FIG. 3.
Figures 4A, 4D:
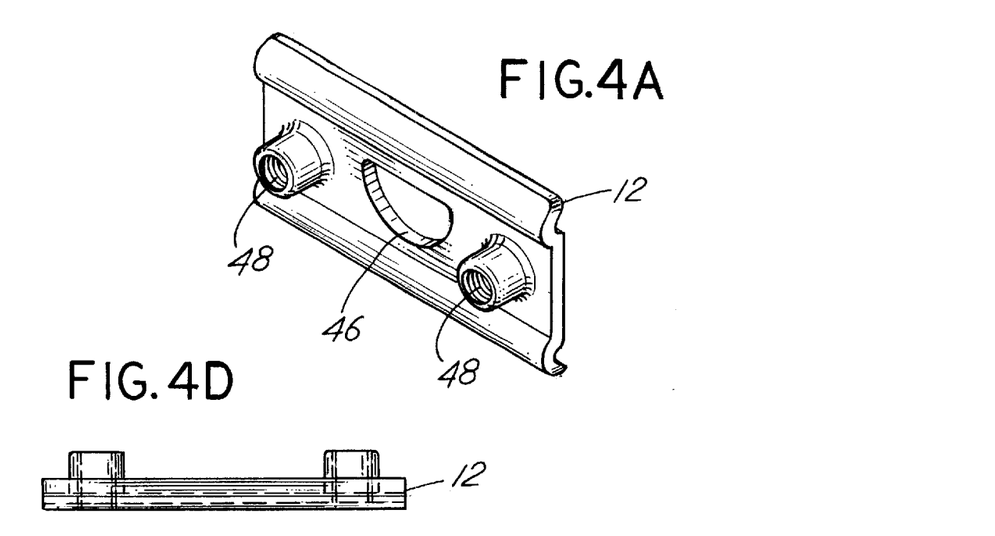
FIGS. 4A–4E are an enlarged series of views of the conveyor nut shown in FIG. 1B.
Figure 4B:
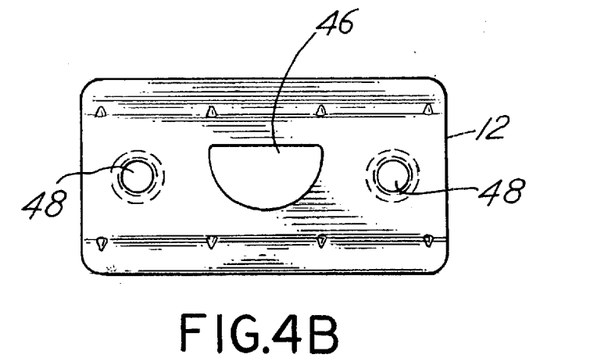
Figure 4C:
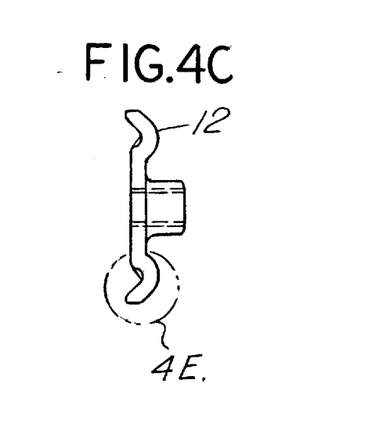
Figure 4E:
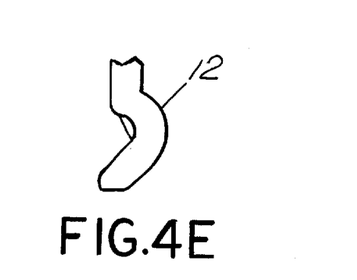

Referring now to FIGS. 3 and 3A, detailed views of two types of straight connector fittings 14, 14F are shown. FIG. 3A shows a splice fitting 14F which includes an expansion slot 34. The expansion slot 34 provides a longitudinal path for bolt stems to travel due to thermal expansion or contraction of the spine sections 15 under extreme weather conditions.

Referring now to FIGS. 4A–4E, the conveyor nut 12 is shown in detail. The conveyor nut 12 includes a support aperture 46 and fastening apertures 48. The support aperture 46 is provided to receive the support member arm 19 which is preferably swaged to the conveyor nut 12. The fastening apertures 48 are provided to secure the conveyor nut, or support member plate, 12 to a spine section 15. Preferably, the conveyor nut 12 is formed from a single punched piece of material. However, it will be recognized by those skilled in the art from the present disclosure that it could be formed from separator pieces which are connected together in a separate operation, such as welding or swaging nuts on an appropriately shaped plate. It will be similarly recognized that the support aperture 46 could be removed or replaced with other types of attachments, such as hooks, or that the fastening apertures 48 could be used alone for connection of external members, such as the support bracket 31 as shown in FIG. 9 which is attached to a conveyor nut 12 located in the attachment slots 26A, 26B.

As shown in FIGS. 1A and 1B, the support member assemblies 17 are slidably engaged in one or both of the attachment slots 26A or 26B along a spine section 15. Upon installation, the support member assembly 17 is slidably adjusted along a spine section 15 to a position where a support member is necessary to support an anticipated load. A bolt or threaded member is inserted into the fastening aperture 48 at the desired spine section location and the threaded member is tightened towards the vertical surface 42A or 42B of attachment slot 26A or 26B. The threaded member functions to force the conveyor nut 12 against the flange sections 38 of the attachment slots 26A or 26B. The curved flange area of the conveyor nut 12 seats into the flange contour to secure the conveyor nut 12 along the attachment slot 26A, 26B at any desired location.

Figure 5:
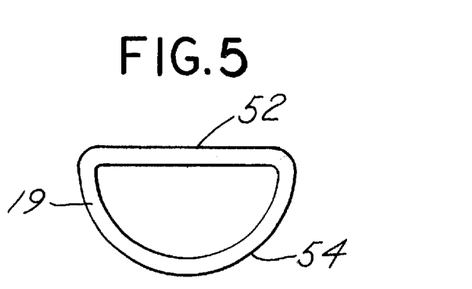
FIG. 5 is a cross sectional view of the support member arm shown in FIG. 1B.

As shown in FIG. 5, the support member arm 19 is preferably tubular with an essentially horizontal portion 52 and a lower curved portion 54. The horizontal portion 52 faces upwardly so as to provide a maximum surface area for the support of conductors to be positioned thereon. Preferably, to form a support member assembly 17, the support member arm 19 is swaged into the support aperture 46 of a conveyor nut 12 to provide a permanent load bearing connection to the conveyor nut 12. However, it will be recognized by those skilled in the art from the present disclosure that the shape and size of the support member arms 19 could be varied. For example, a rectangular cross section could be used. Additionally, the support member arms 19 can be attached to the conveyor nut 12 by other means, such as welding.

Preferably all of the fittings 14A, 14B, 14C, 14D, 14E, 14F shown utilize one or more pieces which have the same cross section as the basic straight connector fitting 14 to provide a variety of connections and junctions as shown in FIG. 1. Additional components can also be utilized, such as the hinge fittings/pieces used in connection with fittings 14B, 14C, shown in FIGS. 7 and 8. It is understood therefore that the fittings are not limited to any specific configuration and that the described embodiments are intended to be exemplary. Preferably the fittings 14, 14A–14E are made of aluminum, with multi-component pieces being welded and/or mechanically fastened together as shown. However, other materials, such as molded fiberglass, and connection systems, such as adhesives could be utilized if desired.

Figures 10, 10A:
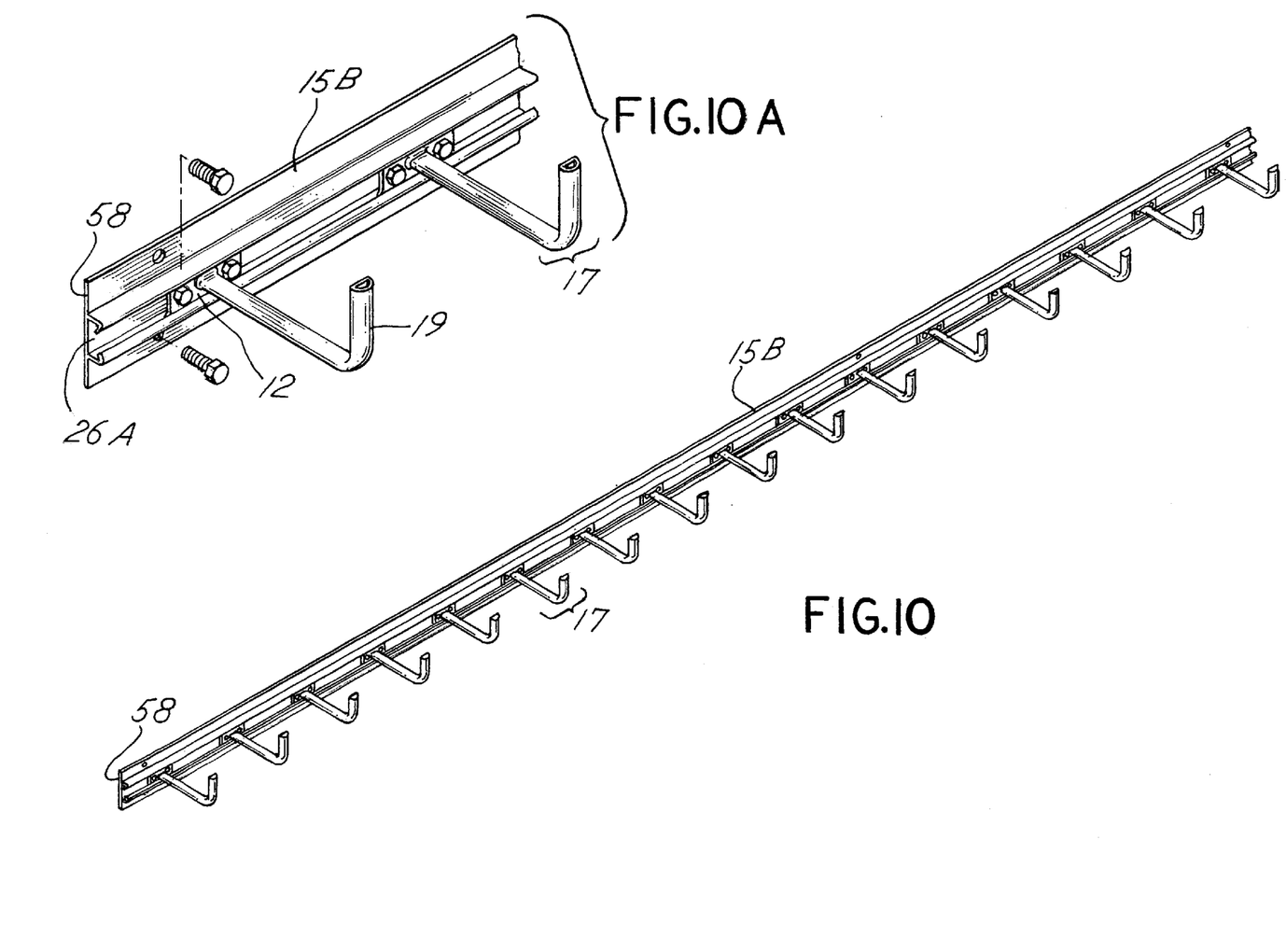
FIG. 10 is a perspective view of a third embodiment of a spine used in connection with the modular cable tray system in accordance with the present invention.
FIG. 10A is an enlarged perspective view of the third embodiment of the spine and a support member assembly of the embodiment of FIG. 10.

Referring now to FIGS. 10 and 10A, a third embodiment of a spine 15B is shown. The spine 15B includes only a single slot 26A. A support surface 58 is provided on an opposite side of the spine 15B from the slot 26A to anchor the spine 15B to a surface, such as a generally vertical wall. The conveyor nuts 12, with or without support member arms 19, are installable and adjustable within the attachment slot 26A in a similar manner to the first embodiment. A discussion of hardware which is common to the first, second and third embodiments of the spines 15, 15A, 15B has been eliminated for the sake of brevity.

Additional accessories, such as closure strips for the slots 24, 26A, 26B and end caps for the spines 15, 105 may be provided, as shown in FIG. 9.

It will be appreciated by those skilled in the art that changes can be made to the embodiments of the invention described above without departing from the broad inventive concept of providing cable tray system have modular structure for providing customization along a conductor path. It is understood, therefore, that the present invention is not limited to the specific embodiments described, but is intended to cover other embodiments within the spirit and scope of the present invention.

What is claimed is:

1. A cable tray for supporting conduit thereon, the tray comprising:
   an elongated spine section including first and second section channels extending along opposing first and second surfaces thereof;
   a plurality of support member assemblies, said support member assemblies each having a support member plate end and a support member arm end opposite the plate end, the plate end engaging said first and second section channels, said plate end including at least one fastening aperture, the support end extending away from the elongated spine section; and
   a plurality of fasteners for threadably engaging the at least one fastening aperture of said support member plate end for securing said plurality of support member assemblies at a desired location along said first and second section channels, said support member assemblies are each slidably positioned at a desired location and fastened thereto to provide a custom arrangement of said support member assemblies about the spine section.

2. The cable tray of claim 1 wherein the first section channel is defined by said first surface and at least two channel walls extending away from said first surface.

3. A cable tray for supporting conduit thereon, the tray comprising:
   an elongated spine section including first and second section channels extending along opposing first and second surfaces thereof;
   a plurality of support member plates slidably engaging said first and second section channels, said plates including a support aperture and at least one fastening aperture;
   a plurality of support member arms corresponding to respective ones of said plurality of support member plates, said support member arms being rigidly secured within the support apertures of the plurality of support member plates such that a free end of the support member arms extends away from the elongated spine section; and
   a plurality of fasteners for threadably engaging the fastening apertures of said support member plates for securing said plurality of support member plates at a desired location along said first and second section channels, said support member arms being slidably positioned at a desired location and fastened thereto to provide a custom arrangement of said support member arms about the spine section.

4. The cable tray of claim 3 wherein the first section channel is defined by said first surface and at least two channel walls extending away from said first surface.

5. The cable tray of claim 4 wherein the at least two channel walls include arcuate end sections, said arcuate end sections at channel wall ends opposite the first surface extending away from the elongated spine section.

6. A cable tray for supporting conduit thereon, the tray comprising:
   at least two elongated spine sections having first and second ends, and including first and second section channels extending along opposing first and second surfaces thereof, the at least two spine sections being interconnected at their ends so as to create opposing continuous first and second lengthwise channels;
   a plurality of support member plates slidably engaging said first and second section channels, said plates including a support aperture and at least one fastening aperture;
   a plurality of support member arms corresponding to respective ones of said plurality of support member plates, said support member arms being rigidly secured within the support apertures of the plurality of support member plates such that a free end of the support member arm extends away from the at least two elongated spine sections; and
   a plurality of fasteners for threadably engaging the fastening apertures of said support member plates for securing said plurality of support member plates at a desired location along the opposing continuous first and second lengthwise channels, said support member arms are slidably positioned at a desired location and fastened thereto to provide a custom arrangement of said support member arms about the length of the spine sections.

7. The cable tray of claim 6 wherein an anchor channel is positioned on a third surface of said at least two elongated spine sections.

8. The cable tray of claim 7 wherein the anchor channel is defined by said third surface and at least two anchor walls.

9. The cable tray of claim 8 wherein the at least two anchor walls include arcuate end sections, said arcuate end sections at anchor wall ends opposite the third surface extending away from the third surface.

10. The cable tray of claim 7 wherein a second anchor channel is positioned on a fourth surface of said at least two elongated spine sections.

11. The cable tray of claim 6 wherein a connector fitting interconnects the at least two elongated spine sections.

12. The cable tray of claim 11 wherein the connector fitting further comprises:
   an upper T-section, wherein the upper T-section includes bulbous spacer portions to provide a sliding fit within the spine section;
   a lower T-section, wherein the lower T-section include bulbous spacer portions to provide a sliding fit within the spine section;
   a first and second connector channel extending along opposing surfaces thereof, wherein the opposing surfaces include bulbous spacer portions to provide a sliding fit within the spine section.

13. The cable tray of claim 6 wherein the plurality of support plates are contoured in complementary relation with the arcuate end sections whereby the fasteners urge the plate end in the direction of the arcuate end section upon threadably engaging the fastening apertures.

14. A cable tray for supporting conduit thereon, the tray comprising:
   an elongated spine section including a section channel and a support surface extending along opposing first and second surfaces thereof, wherein the support surface can be used to attach the spine section to a vertical wall;
   a plurality of support member assemblies, said support member assemblies having a support member plate end and a support member arm end opposite the plate end, the plate end engaging the section channel, the plate end including at least one fastening aperture, the support end extending away from the elongated spine section; and
   a plurality of fasteners for threadably engaging the at least one fastening aperture of said support member plate end for securing said plurality of support member assemblies at a desired location along the section channel, the support member assemblies being slidably positioned at a desired location and fastened thereto to provide a custom arrangement of said support member assemblies about the spine section.

15. A cable tray for supporting conduit thereon, the tray comprising:
   an elongated spine section including first and second section channels extending along opposing first and second surfaces thereof, wherein the section channels are defined by said first and second surfaces and at least two channel wall ends opposite the first and second surfaces, and the at least two channel walls include flange sections at channel wall ends of said at least two channel walls opposite the first and second surfaces, the flange sections curved inwardly with respect to the first and second surfaces;
   a plurality of support member assemblies, said support member assemblies each having a support member plate end and a support member arm end opposite the plate end, the plate end engaging said first and second section channels, said plate end including at least one fastening aperture, the support end extending away from the elongated spine section;
   a plurality of fasteners for threadably engaging the at least one fastening aperture of said support member plate end for securing said plurality of support member assemblies at a desired location along said first and second section channels whereby said support member assemblies are each slidably positioned at a desired location and fastened thereto to provide a custom arrangement of said support member assemblies about the spine section.

16. A cable tray for supporting conduit thereon, the tray comprising:
   an elongated spine section including first and second section channels extending along opposing first and second surfaces thereof, wherein the section channels are defined by said first and second surfaces and at least two channel wall ends opposite the first and second surfaces, and the at least two channel walls include flange sections at channel wall ends opposite the first and second surfaces, the flange sections curved inwardly with respect to the first and second surfaces;
   a plurality of support member assemblies, said support member assemblies each having a support member plate end and a support member arm end opposite the plate end, the plate end engaging said first and second section channels, said plate end including at least one fastening aperture, the support end extending away from the elongated spine section wherein the plate ends of said support member assemblies are contoured in complementary relation with said flange sections whereby the fasteners urge the plate end in the direction of the flange section upon threadably engaging the fastening apertures;

a plurality of fasteners for threadably engaging the at least one fastening aperture of said support member plate end for securing said plurality of support member assemblies at a desired location along said first and second section channels whereby said support member assemblies are each slidably positioned at a desired location and fastened thereto to provide a custom arrangement of said support member assemblies about the spine section.

* * * * *